United States Patent [19]
Chiotti et al.

[11] B 3,982,928
[45] Sept. 28, 1976

[54] SEPARATION OF URANIUM FROM (TH,U)O₂ SOLID SOLUTIONS

[75] Inventors: Premo Chiotti, Ames, Iowa; Mahesh Chandra Jha, Arvada, Colo.

[73] Assignee: The United States of America as represented by the United States Energy Research and Development Administration, Washington, D.C.

[22] Filed: Jan. 3, 1975

[21] Appl. No.: 538,491

[44] Published under the second Trial Voluntary Protest Program on February 17, 1976 as document No. B 538,491.

[52] U.S. Cl. .................................. 75/84.1 R; 423/5
[51] Int. Cl.² .......................................... C22B 60/02
[58] Field of Search .................. 75/84.1 R, 84.1 A; 423/5

[56] References Cited
OTHER PUBLICATIONS

Kately, J.A. et al. "Reaction of Thoria with Zirconium Chloride" in J. Less Com. Met., 26(1) pp. 145–155, 1972.

Chiotti, P. et al. "Binary Systems $ThCl_4$–Th and $ThCl_4$–$ThOCl_2$" in J. Less Com. Met., 31(3): pp. 365–376, June, 1973.

JHA, M.C., NSA 30: 03864 [Pyrometallurgical Separation of Uranium from $(Th,U)O_2$ Solid Solutions — Thesis, 1974].

Primary Examiner—Benjamin R. Padgett
Assistant Examiner—R. E. Schafer
Attorney, Agent, or Firm—Dean E. Carlson; Arthur A. Churm; James W. Weinberger

[57] ABSTRACT

Uranium is separated from mixed oxides of thorium and uranium by a pyrometallurgical process in which the oxides are mixed with a molten chloride salt containing thorium tetrachloride and thorium metal which reduces the uranium oxide to uranium metal which can then be recovered from the molten salt. The process is particularly useful for the recovery of uranium from generally insoluble high-density sol-gel thoria-urania nuclear reactor fuel pellets.

7 Claims, No Drawings

_3,982,928_

SEPARATION OF URANIUM FROM (TH,U)O$_2$ SOLID SOLUTIONS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method for separating uranium from thorium. More specifically, this invention relates to a method for separating uranium from a mixture of thorium and uranium oxides.

In order to meet the ever increasing demand for energy with limited natural resources, considerable work has been done throughout the world on the development of breeder reactors. Because of the larger and cheaper resources of thorium in comparison to uranium, interest has been stimulated in Th-U-233 fuel cycle. In this cycle, U-233 is bred by neutron capture and beta decay. U-233 is a better fissile material than U-235 and it is expected that Th-U-233-fueled reactors can produce energy at a lower price than does a U-235-fueled reactor.

One of the disadvantages of the thorium cycle is that the reprocessing of thorium-based fuel is more difficult in comparison to that of uranium-based fuel, if the same facilities are to be used. However, if a nonaqueous reprocessing method is developed, which in general is more compact and involves a smaller number of chemical steps, the thorium fuel cycle may become still more attractive. A wide variety of nonaqueous methods have been developed for reprocessing of different types of nuclear fuels. Many of these processes involve oxidation-reduction reactions in the presence of fused salts and, because of their similarity to pyrometallurgical methods used in extraction of metals, these reprocessing methods have been called pyrometallurgical reprocessing methods.

In the early stages of the development of the thorium cycle, metallic fuel was under consideration. A pyrometallurgical process was developed which involves oxidation-reduction reactions in a fused salt-liquid metal system and the transfer of solutes from one alloy phase to the other through a fused salt phase.

However, the recent trend is towards ceramic fuel and considerable work has been done on the oxide fuels. Some of the breeder reactors are being planned for an oxide fuel consisting of UO$_2$ dissolved in ThO$_2$. The (Th,U)O$_2$ prepared by the sol-gel process is extremely inert in aqueous mediums and sol-gel ThO$_2$ has been found to react slowly in the presence of fused salt bath. Thus, a pyrometallurgical reprocessing method becomes still more desirable for (Th,U)O$_2$ fuels.

The pyrometallurgical method developed for separation of metallic uranium and thorium may be used for oxides if the oxides are reduced to metals in a preliminary step. This approach has been used for (U,Pu)O$_2$ fuels. Fused salt-liquid metal systems have been developed for the reduction of UO$_2$ and ThO$_2$. However, it has been noted that the reduction of sol-gel ThO$_2$ fired at 650°C. is very difficult and some preliminary work has indicated that dense sol-gel ThO$_2$ pellets fired at 2800°C. cannot be reduced by this method.

SUMMARY OF THE INVENTION

We have discovered a pyrometallurgical process which, by utilizing the difference in reduction behavior of UO$_2$ and ThO$_2$, we are able to separate uranium from thorium when the oxides are present together as a sol-gel (Th,U)O$_2$ solid solution.

By the method of the invention, uranium values are separated from mixed oxides of thorium and uranium by mixing the metal oxides with a molten chloride salt containing thorium tetrachloride and thorium metal, the molten salt being selected from the group consisting of alkali metals, alkaline earth metals and mixtures thereof, whereby the uranium oxide is selectively reduced to uranium metal, and recovering the uranium metal.

It is therefore one object of this invention to provide a method for separating uranium from thorium.

It is another object of this invention to provide a method for separating uranium from thorium when both are present together as mixed oxides.

Finally, it is the object of this invention to provide a method for separating uranium from thorium when both are present together in a high-density sol-gel (Th,U)O$_2$ solid solution.

DESCRIPTION OF THE PREFERRED EMBODIMENT

These and other objects of the invention for separating uranium values from a mixture of thorium oxide and uranium oxide may be met by powdering the metal oxides, mixing the powdered metal oxides with a fused molten chloride salt whereby the mixture contains 2–15 weight percent metal oxides, said salt being selected from the group consisting of potassium chloride — 58.5 mole percent lithium chloride and sodium chloride — 39.9 mole percent magnesium chloride, said salt also containing about 2 to 10 weight percent thorium tetrachloride and a slight excess of a stoichiometric amount of thorium metal to reduce the uranium present in the metal oxides, whereby the uranium oxide is reduced to uranium metal, and recovering the uranium metal.

While molten chloride salts such as KCl — 58.5 mole % LiCl and NaCl — 39.9 mole % MgCl$_2$ have been used successfully, the molten chloride salt may be an alkali metal chloride salt, an alkali earth metal chloride or a mixture of alkali metal chloride and alkaline earth metal chloride. Thus any of the above chloride salts or mixtures of chloride salts which are not reduced by thorium metal and which are molten at a conveniently low temperature, such as below about 800°C., are satisfactory. KCl — 58.5 mole % LiCl is preferred since it has a melting point of about 355°C. which is the lowest of the salts, while NaCl — 39.9 mole % MgCl$_2$, which melts at about 450°C., is about the least expensive of the salts.

The molten salt must contain sufficient thorium tetrachloride to catalyze and act as an intermediate in the reaction sequence to reduce the uranium oxide to uranium metal. In general, this may vary from 2 to about 20 wt. % of the salt, while 2 to about 10 wt. % is preferred, since the higher concentration of ThCl$_4$ will retain some uranium as UCl$_3$ in the salt solution.

The molten salt must also contain a small quantity of thorium metal whose presence is necessary to complete the reduction reaction. There must be at least a stoichiometric amount of thorium metal present to reduce the uranium present to uranium metal, although a slight excess is preferred to ensure complete reduction. The thorium may be present in the molten state as either metal chips or as a powder.

While the mixed thorium-uranium oxides from which the uranium is to be separated may be added to the molten salt as pellets, it is preferred that the oxides be in the form of a fine powder to speed up the reaction. In general, a powder size of from −200 to 100 mesh (U.S. Sieve) was found to provide adequate process rates. The amount of powdered oxide which can be added to the molten salt can range from about 2 to about 15% by weight of the salt. Because the oxides are insoluble in the salt, more than about 15% will decrease fluidity to the extent that manipulation of the solution would be difficult. It is necessary that, because of the viscous physical properties of the molten salt-oxide mixture, continuous agitation of the mixture is to be preferred to prevent reaction times from being inordinately long.

The temperature of the molten salt mixed oxides mixture may vary from about 500° to about 800°C. depending upon the melting point of the particular salt in use. Temperatures below about 500°C. will reduce the reaction rate to an undesirable level, while above about 800°C. corrosion of equipment, evaporation of salts and a less favorable thermodynamic equilibrium for the over-all reaction may result.

The process must take place under an inert atmosphere to prevent oxidation and to prevent precipitation of $ThCl_4$ and $UCl_3$ from the process solution.

Tantalum has been satisfactory as a process containment vessel, as might cast iron or high silicon steel. Vycor (Trademark) was also found to be satisfactory at temperatures up to about 700°C.

The theory of the reduction of the $UO_2$ is set out in the following sequence of reactions:

$$ThO_2 + ThCl_4 \rightarrow 2\ ThOCl_2$$
$$UO_2 + ThCl_4 \rightarrow ThOCl_2 + UOCl_2$$
$$UOCl_2 + Th \rightarrow ThOCl_2 + U$$
$$2\ ThOCl_2 \rightarrow ThO_2 + ThCl_4$$

The underscored components are present in the molten salt mixture as solids. The $ThO_2$ passes into solution as $ThOCl_2$ and as $UO_2$ is exposed it reacts with $ThCl_4$ to produce $UOCl_2$ and $ThOCl_2$. Subsequent reaction of $UOCl_2$ with the thorium metal present yields more $ThOCl_2$ and, as the solubility limit is exceeded, it dissociates to regenerate $ThCl_4$ and form a finely divided precipitate of $ThO_2$. Both $ThOCl_2$ and $UOCl_2$ are only sparingly soluble in the salt solution. Some $UCl_3$ is present in the final salt mixture and reduction of the uranium oxide probably involves more than the two steps indicated above.

A benefit found by this process is that the finely divided thoria is much more reactive than the initial sol-gel material and as such it is much more amenable to aqueous dissolution. This thoria could also be reduced to thorium metal with zinc-magnesium alloy if it were desirable to do so or it may be separated as such, further purified of fission products and refabricated into fuel pellets without being redissolved.

The uranium metal can be recovered from the molten salt-thorium oxide mixture by the use of molten salts. For example, the molten salt containing dissolved $ThOCl_2$ and thorium tetrachloride is decanted from the solids which are uranium metal, thorium metal, thorium oxide and any uranium oxide which has not been reduced. The solids are then contacted with a fresh molten chloride salt containing a slight excess of a stoichiometric amount of zinc chloride necessary to react with the uranium metal, whereby the uranium metal is oxidized to $UCl_3$ which dissolves in the molten salt. The salt containing the $UCl_3$ is then decanted or otherwise separated from the thorium metal, thoria and uranium and contacted with a molten zinc − 5 wt % magnesium alloy which reduces the $UCl_3$ to uranium metal which precipitates and can be readily recovered from the alloy. By an alternate method, air may be bubbled through the molten salt containing the zinc chloride, whereby the $UCl_3$ is oxidized to urania which precipitates and can then be readily separated from the molten salt.

It might be noted that times required to reach equilibration may be lengthy due to the insolubility of the sol-gel thorium-uranium oxides. Thus, with finely ground mixed oxides powder, equilibration times of 200 to 300 hours may be necessary.

Because the method of this invention is capable of quantitative recovery of uranium values from a solid solution of thorium-uranium oxides, it is possible to recover very small quantities of uranium of 1% or less contained in an oxides mixture. While such quantitative recovery is generally not necessary when reprocessing spent nuclear reactor fuel, it is desirable when attempting to determine breeding ratios of U-233 in the fuel.

This process is also readily adaptable to the separation of fission products during a fuel reprocessing cycle. For example, the nobel metals fission products would be reduced by the thorium and would be separated from the molten salt with the metallic uranium. The more active metals such as the rare earth metals, the alkali and alkaline earth metals would not reduce and would thus remain in the molten salt. The molten salt mixture and the uranium mixture after redissolution could then be contacted with appropriate alloys or molten salts known to those skilled in the art to purify them of the undesirable fission products.

The following example is given as illustrative of the process of the invention and is not to be taken as limiting the scope of the invention.

EXAMPLE

A number of experiments were made in which $(Th,U)O_2$ solid solutions prepared by the sol-gel process and obtained from Oak Ridge National Laboratory were ground to a fine powder, −200 mesh, and contacted with a molten fused salt in a tantalum crucible at 700°C. in a rocking furnace under an argon atmosphere. The results of the separation of the uranium are shown in the table below. It might be noted that pure thoria has a lattice parameter of 5.597 A.

| Expt. No. | Equili-[a] bration time hrs. | Salt[b] | Charge, g | | | Salt analysis | | | X-ray powder patterns | |
|---|---|---|---|---|---|---|---|---|---|---|
| | | | $ThCl_4$ | Thorium | Oxide | % U in[c] oxide | Wt % U | Wt % Th | Metal phase | Oxide phase lattice parameter, A |
| 2-167 | 70 | 10.00 | 0.36 | 0.51 | 4.55 | 9.75 | 0.18 | 2.42 | uranium | 5.598 |
| 4-59 | 132 | 20.00 | 1.00 | 0.50 | 2.00 | 7.81 | 0.151 | 2.88 | uranium | 5.597 |

-continued

| Expt. No. | Equilibration[a] time hrs. | Salt[b] | ThCl$_4$ | Charge, g Thorium | Oxide | % U in[c] oxide | Salt analysis Wt % U | Wt % Th | X-ray powder patterns Metal phase | Oxide phase lattice parameter, A |
|---|---|---|---|---|---|---|---|---|---|---|
| 4-63 | 187 | 37.50 | 2.50 | 1.00 | 5.00 | 7.81 | 0.185 | 3.79 | uranium | 5.598 |
| 4-77 | 204 | 14.70 | 3.04 | 0.50 | 2.05 | 1.16 | 0.033 | 10.86 | thorium | 5.596 and 5.595 |
| 4-81 | 204 | 15.03 | 2.00 | 0.50 | 2.00 | 1.16 | 0.031 | 7.33 | thorium | 5.597 and 5.596 |
| 4-89 | 330 | 15.06 | 2.00 | 0.50 | 2.00 | 7.81 | 0.267 | 6.82 | uranium | 5.597 |
| 4-93 | 330 | 13.05 | 4.00 | 0.50 | 2.00 | 7.81 | 0.440 | 14.13 | uranium | 5.597 |

[a]All the equilibrations were done at 700°C. in a rocking furnace.
[b]KCl-58.5 mole % LiCl eutectic was used in Experiments 4-89 and 4-93, NaCl-39.9 mole % MgCl$_2$ in others.
[c]Based on chemical analysis of starting oxide.

The lattice parameters in the oxide phase indicate that, except for experiments 4-77 and 4-81 where a large excess of thorium powder was used, the oxide contains very little uranium oxide, indicating that the uranium has been separated away from the thorium oxide.

It can be seen from the results given above that the process of this invention is capable of obtaining good separations of uranium from a mixed uranium-thorium oxides solid solution.

The embodiments of the invention in which an exclusive property or privilege is claimed are defined as follows:

1. A method for separating uranium values from a mixture of thorium oxide and uranium oxide comprising:
   a. mixing the metal oxides with a molten chloride salt additionally containing thorium tetrachloride and thorium metal, said salt being selected from the group consisting of the salts of the alkali metals, alkaline earth metals and mixtures thereof, whereby the uranium oxide is selectively reduced to uranium metal, and
   b. recovering the uranium metal.

2. The process of claim 1 wherein the metal oxides are powdered and the molten chloride salt is mixed with about 2 to 15% by weight of the powdered metal oxides.

3. The process of claim 2 wherein the molten salt contains 2 to 20 wt % thorium tetrachloride and a stoichiometric amount of thorium metal to reduce the uranium present in the molten salt mixture to uranium metal.

4. The process of claim 3 wherein the molten chloride salt is selected from the group consisting of potassium chloride — 58.5 mole percent lithium chloride and sodium chloride — 39.9 mole percent magnesium chloride.

5. The process of claim 4 wherein the temperature of the molten salt is between 500° and 800°C.

6. The process of claim 5 wherein the uranium metal is recovered from the molten salt by separating the molten salt containing the dissolved thorium tetrachloride from the solids of uranium metal, thorium metal, thorium oxides and uranium oxides, contacting the solids with a molten chloride salt from the group consisting of alkali metals, alkaline earth metals and mixtures thereof and containing a slight excess of a stoichiometric amount of zinc chloride to react with the uranium metal, whereby the uranium metal is oxidized to UCl$_3$ which dissolves in the molten salt, separating the molten salt containing the UCl$_3$ from the other solids and contacting the molten salt containing the UCl$_3$ with a zinc — 5 wt % magnesium alloy, whereby the UCl$_3$ is reduced to uranium metal which precipitates in the zinc-magnesium alloy.

7. The process of claim 5 wherein the uranium metal is recovered from the molten salt.

* * * * *